(No Model.)
C. PICK.
WATER HEATER.
No. 245,399. Patented Aug. 9, 1881.
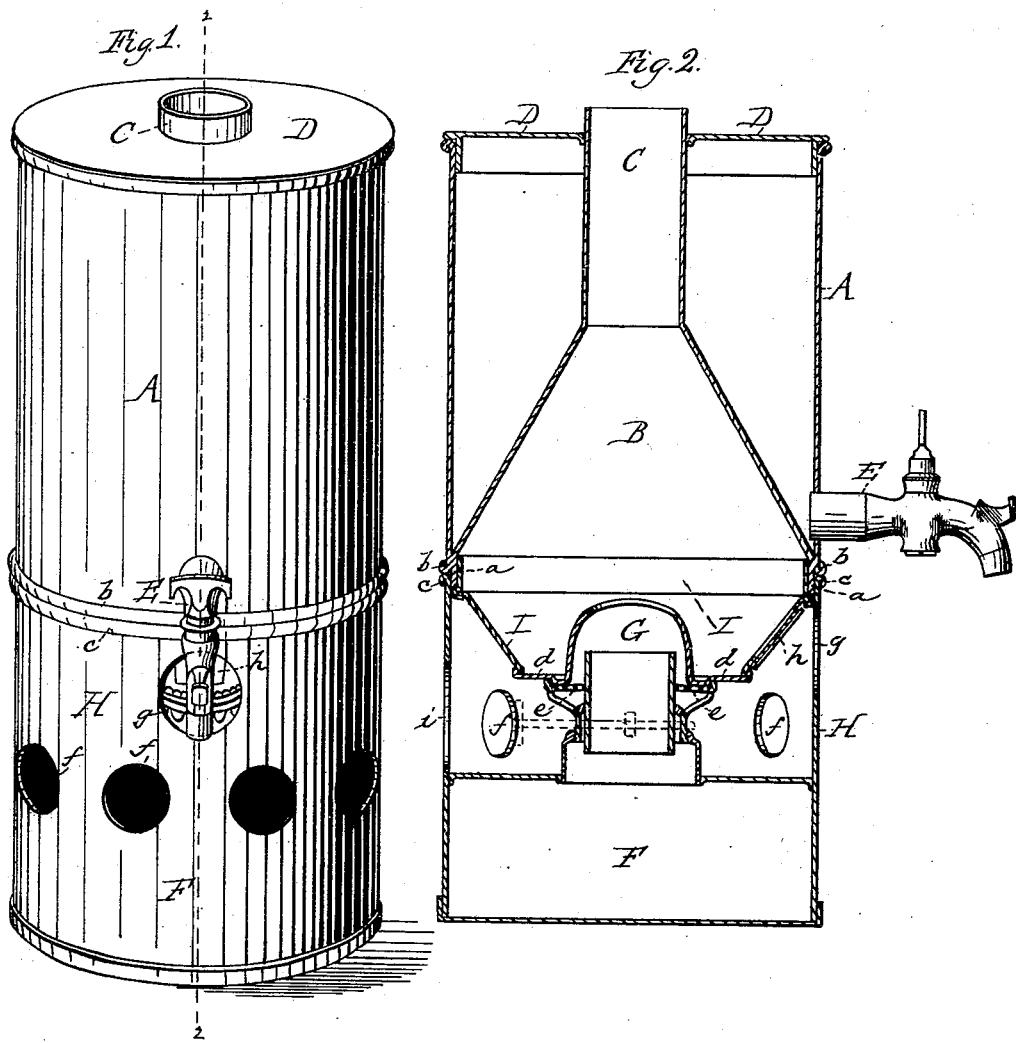
Witnesses
F. B. Townsend
F. H. Kaschagen
Inventor
Charles Pick,
By Latz & Dyer,
Attys.

UNITED STATES PATENT OFFICE.

CHARLES PICK, OF CHICAGO, ILLINOIS.

WATER-HEATER.

SPECIFICATION forming part of Letters Patent No. 245,399, dated August 9, 1881.

Application filed May 2, 1881. (No model.)

*To all whom it may concern:*

Be it known that I, CHARLES PICK, of Chicago, in the county of Cook and State of Illinois, have invented a certain new and useful Improvement in Water-Heaters, of which the following is a specification.

The object I have in view is to produce a simple, convenient, and efficient device for heating water, especially designed for use in saloons and other like places; and my invention consists in the peculiar construction of my water-heater, as fully hereinafter explained, and pointed out by the claim.

In the accompanying drawings, forming a part hereof, Figure 1 is a perspective view of the water-heater, and Fig. 2 a central vertical section of the same.

Like letters denote corresponding parts in both figures.

A is a cylindrical vessel, having in the lower end of the same a conical chimney, B, which is secured to the vessel A at its lower edge and projects up into the same. From the top of this conical chimney extends a pipe, C, projecting up through the annular cover D, which sets into the top of the vessel A. With the lower end of the water-space of the vessel A is connected a faucet, E, for drawing off the water as required.

Below the vessel A, as thus constructed, is placed a gas or wick burner, the heat from the flame being drawn up through the center of the vessel A, and the conical chimney B giving a large heating-surface, which enables the water to be heated in an exceedingly short time.

The form of lamp which I prefer for heating the water in the vessel A is shown in the drawings. It is composed of a cylindrical oil-reservoir, F, on the center of which is mounted a burner, G. The shell of the oil-reservoir F is extended upwardly above the top of such reservoir, forming a jacket, H, which surrounds the burner and rises above the same.

Upon the top of the jacket H rests the vessel A, such vessel having a flange, *a*, which enters said jacket and forms a tight joint therewith, and a bead, *b*, which rests upon the wired upper edge, *c*, of the jacket.

Upon the cone-plate *d* of the burner G rests a flaring annular shield, I, which at its upper edge fits closely against the inner side of the flange *a* of the vessel A. This shield completes the chimney, in connection with the upper portion, B, and only permits the air to reach the flame by entering under the cone through the perforated diaphragm *e*, which surrounds the wick-tube.

The jacket H has a number of openings, *f*, through which air enters such jacket for feeding the flame and for keeping the oil-reservoir cool. The jacket H has a larger opening, *g*, near its top, on one side, which is coincident with a glazed opening, *h*, in the shield I, so that the condition of the flame can be readily ascertained. Another large opening, *i*, is made in the jacket H, opposite the milled head of the wick-adjusting stem, whereby access can be had to adjust the wick without raising the vessel A off of the said jacket. The shell of the jacket H and oil-reservoir F forms a continuation of the shell of the vessel A, so that the whole makes a symmetrical and compact article.

What I claim as my invention is—

A water-heater composed of the water-vessel A, provided with a conical chimney, B, having pipe C projecting upwardly therefrom to and above the cover D, a faucet, E, and a flange, *a*, at its bottom, oil-reservoir F, having upwardly-extending shell or sides, and forming a jacket, H, for supporting the vessel A, said jacket having ventilating-openings *f* and openings *g* and *i*, for the purpose described, the burner G, and the flaring annular shield I, closely fitting against the inner side of the flange *a*, and having a glazed opening, *h*, as described.

CHARLES PICK.

Witnesses:
F. W. KASEHAGEN,
OLIVER W. MARBLE.